United States Patent
Buckley

(10) Patent No.: US 11,263,251 B2
(45) Date of Patent: Mar. 1, 2022

(54) METHOD FOR DETERMINING OUTPUT DATA FOR A PLURALITY OF TEXT DOCUMENTS

(71) Applicant: Siemens Aktiengesellshaft, Munich (DE)

(72) Inventor: Mark Buckley, Munich (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 181 days.

(21) Appl. No.: 16/385,054

(22) Filed: Apr. 16, 2019

(65) Prior Publication Data
US 2019/0325026 A1   Oct. 24, 2019

(30) Foreign Application Priority Data
Apr. 19, 2018   (EP) .................................... 18168202

(51) Int. Cl.
*G06F 16/35* (2019.01)
*G06F 40/30* (2020.01)
*G06F 40/284* (2020.01)

(52) U.S. Cl.
CPC ............ *G06F 16/35* (2019.01); *G06F 40/284* (2020.01); *G06F 40/30* (2020.01)

(58) Field of Classification Search
CPC ......... G06F 16/35; G06F 40/30; G06F 40/284
USPC .......................................................... 704/9
See application file for complete search history.

(56) References Cited

U.S. PATENT DOCUMENTS

| | | | |
|---|---|---|---|
| 2003/0028504 A1* | 2/2003 | Burgoon | G06K 9/6217 |
| 2009/0287642 A1* | 11/2009 | Poteet | G06Q 30/02 |
| 2012/0023006 A1* | 1/2012 | Roser | G06Q 40/00 705/38 |
| 2012/0041906 A1* | 2/2012 | Huh | G06K 9/00221 706/12 |

(Continued)

OTHER PUBLICATIONS

Internetarchivebot et al: "Non-negative matrix factorization", Wikipedia—the free encyclopedia, pp. 1-17, XP055511255, Retrieved from the Internet: URL:https://en.wikipedia.org/w/index.php?title=Non-negative matrix_factorization&oldid=826789133, [retrieved on Oct. 1, 2018], pp. 1-3, pp. 8: section "Text mining"; 2018.

*Primary Examiner* — Edwin S Leland, III
(74) *Attorney, Agent, or Firm* — Schmeiser, Olsen & Watts LLP

(57) ABSTRACT

Provided is a method for determining output data for a plurality of text documents, including the steps of: providing a feature matrix as input data; wherein the feature matrix includes information about frequencies of a plurality of features within the plurality of text documents; clustering the feature matrix using a clustering algorithm into at least one clustering matrix; wherein the at least one clustering matrix includes information about the cluster membership of each document of the plurality of documents or each feature of the plurality of features, assigning at least one score to each feature of the plurality of features based on the at least one clustering matrix; ranking the plurality of features based on their assigned scores; and outputting the ranked features as output data. A corresponding computer program product and system is also provided.

12 Claims, 4 Drawing Sheets

12

| NMF output | Cluster | Feature | Normalised feature weight |
|---|---|---|---|
| Interpreted as | Concept | Concept expression | score |
| | Finance | Interest rate | 0.4 |
| | Finance | Government bond | 0.2 |
| | Technology | Interest rate | 0.11 |
| | Sport | Football match | 0.15 |
| | ... | ... | ... |

(56) References Cited

U.S. PATENT DOCUMENTS

| | | | | |
|---|---|---|---|---|
| 2012/0330958 | A1* | 12/2012 | Xu | G06F 17/16 |
| | | | | 707/738 |
| 2013/0151520 | A1* | 6/2013 | Ankan | G06F 40/30 |
| | | | | 707/737 |
| 2017/0004198 | A1* | 1/2017 | Zholudev | G06F 16/9024 |
| 2019/0325026 | A1* | 10/2019 | Buckley | G06F 40/284 |

* cited by examiner

FIG 2
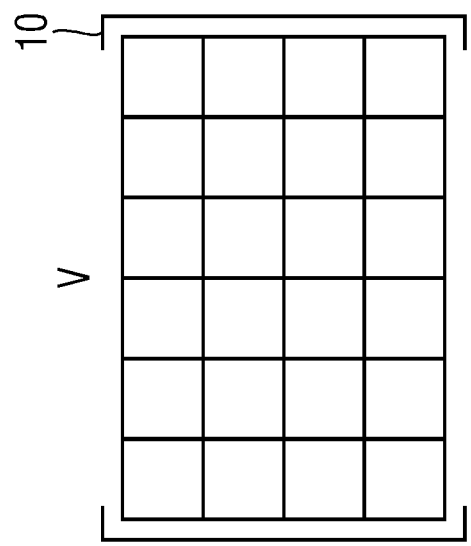
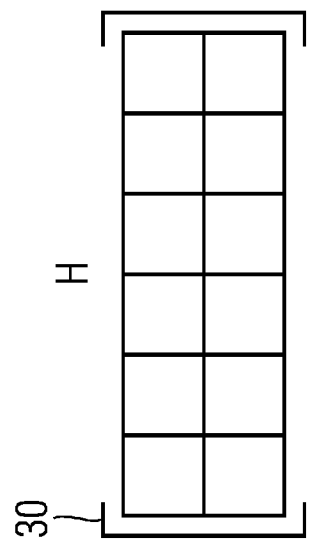
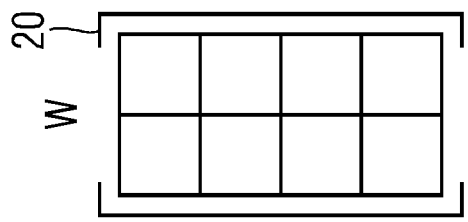

FIG 3

| NMF output | Cluster | Feature | Normalised feature weight |
|---|---|---|---|
| Interpreted as | Concept | Concept expression | score |
| | Finance | Interest rate | 0.4 |
| | Finance | Government bond | 0.2 |
| | Technology | Interest rate | 0.11 |
| | Sport | Football match | 0.15 |
| | ... | ... | ... |

FIG 4

| Concept expression | Total score |
|---|---|
| Interest rate | 0.51 |
| Government bond | 0.2 |
| Football match | 0.15 |
| ... | ... |

METHOD FOR DETERMINING OUTPUT DATA FOR A PLURALITY OF TEXT DOCUMENTS

CROSS-REFERENCE TO RELATED APPLICATIONS

This application claims priority to European application No. 18168202.2, having a filing date of Apr. 19, 2018, the entire contents of which are hereby incorporated by reference.

FIELD OF TECHNOLOGY

The following relate to a computer-implemented method for determining output data for a plurality of text documents, a corresponding system and computer program product. The technical field relates to Natural Language Processing (NLP).

BACKGROUND

The annotation of unlabelled text documents is known from the prior art. The annotation can also be interpreted as the determination of meta data. Further, the unlabelled text documents can be defined as documents in text format which do not have any kind of meta data. Thereby, the meta data includes data about e.g. categorical or classification information, concepts, themes, topics and any other content information which occurs in the text documents. Furthermore, the meta data also includes e.g. the words, phrases and any other expressions which are related to or typical for the aforementioned meta data, which may or may not occur in the given document. Thus, the first type of the meta data can be noted as concept and the other type of the concept related meta data as concept expression in the following.

Accordingly, usually, this meta data is not available for a user or reader of the text documents. This lack of meta data is a disadvantage for the reader since the data is important for several reasons. The words and phrases e.g. give an overview of the topics in the text documents and indicate their relative importance. Moreover, the meta data can be used to perform a subsequent analysis on the text documents. This subsequent analysis is important to get the relevant meaning of the content of the text documents.

Usually, according to prior art, the annotation of the unlabelled text documents is performed manually. In this case, an expert determines the concepts as first type of meta data expected to be encountered in the given text documents. Then, the expert also determines the content expressions as second type of meta data related to the concepts in a similar manner. Thereafter, an iterative process of annotation and review can follow to validate the expert's annotation results. However, the disadvantage is that the manual annotation by the expert is based on subjective information, is time-consuming and error-prone.

Moreover, the experts have to deal with an increasing amount of text documents. Those large or voluminous data sets are known under the terms "big data" or "large scale data". The manual analysis of big data becomes unfeasible for the experts.

Thus, the importance of automated large scale data analysis or data processing will in-crease in the future. This analysis or processing paradigm encompasses a series of different methods and systems to process big data. However, so far, traditional data processing application software does not deal with them adequately. Big data challenges include in particular capturing data, data storage, data analysis, search, sharing, transfer, visualization, querying, updating, information privacy and data source.

There is no automated method available to date for determining meta data for text documents on a large scale in an automated manner.

SUMMARY

An aspect relates to a method for determining output data for a plurality of text documents in an efficient and reliable manner.

The method for determining output data for a plurality of text documents comprises the steps of:
a. providing a feature matrix as input data; wherein
b. the feature matrix comprises information about frequencies of a plurality of features within the plurality of text documents;
c. clustering the feature matrix using a clustering algorithm into at least one clustering matrix; wherein the at least one clustering matrix comprises information about the cluster membership of each document of the plurality of documents or each feature of the plurality of features,
d. assigning at least one score to each feature of the plurality of features based on the at least one clustering matrix;
e. ranking the plurality of features based on their assigned scores; and
f. outputting the ranked features as output data.

The embodiments of the invention are directed to a method for determining output data for a plurality of text documents. Thereby, the text documents are in particular the aforementioned unlabelled text documents without any meta data. The text documents are in particular available as big data.

First, a feature matrix is used as input for a clustering algorithm in order to cluster the feature matrix into at least one clustering matrix as output. In other words, the values of the feature matrix are used to cluster the documents. The feature can be any kind of numeric information related to the text documents. Thereby, each row of the feature matrix comprises the information for a single text document.

Additionally to the feature matrix, known features which are expected to occur in the text documents can be provided as additional input for the clustering algorithm.

Then, the one or more clustering matrices are used as input for scoring and ranking the features into a ranked list of features. For example, one matrix can be a document representation matrix and another matrix can be a feature representation matrix. One of those matrices or both matrices can be used for the next method steps. Then, a score is calculated for each feature using the one or more clustering matrices. The features are ranked by their scores. This has the advantage that features with higher importance for characterizing the concept at hand are ranked higher in the output data.

The method enables data processing of unlabelled text documents in a fully automated and efficient manner. No expert knowledge is required any more to process a large set of text documents, big data. Thus, the method according to the embodiments of the invention advantageously has significant cost savings compared to prior art.

The method according to the embodiments of the invention uses frequency information in an intermediate processing step to construct the frequency matrix. Contrary to prior art approaches, this information is additionally considered but not solely used to compute the scores for the features. Thus, the scores according to the embodiments of the invention are more likely to reflect the true relative importance of the features since they are computed in relation to the concepts which occur in the text documents.

In one aspect the cluster is associated with a first meta data set, comprising at least one element selected from the group, comprising: a categorical or classification information, a concept, a theme, a topic and any other content information associated with at least one text document of the plurality of text documents.

In one aspect the feature is associated with a second meta data set, comprising at least one element selected from the group, comprising: a word, a phrase and any other expression which is associated with the first meta data set.

In another aspect the output data comprises the first meta data set and/or the second meta data set.

Accordingly, the text documents can be divided into distinct meta data sets. To avoid repetition, reference is made to the aforementioned definitions.

For example, the term "feature" can be interpreted as concept expression. The concept expression refers to an expression, a term, a word, a phrase or a product name which can occur in a text document. The text documents can be clustered according to some salient content of the text document into clusters. The term "cluster" can be interpreted as a concept. A single text document can have partial membership of many clusters, wherein each cluster is characterized by many features.

In another aspect, the step of providing comprises the steps of:
processing each text document of the plurality of text documents into according sequences of tokens based on the text structure of the text document;
converting each sequence of tokens of the plurality of sequences of tokens into according features based on an extraction of sub-sequences of the sequence of tokens;
assembling the plurality of features into the feature matrix based on the occurrence of the plurality of features among the plurality of text documents.

Accordingly, the feature matrix is generated by three steps: preprocessing, feature extraction and feature matrix construction. In the second step, the sequences of tokens are processed, according to which the sequences of tokens are split into overlapping and/or nonoverlapping subsequences. For example, in a set of newspaper texts one feature might be "finance" and the set of features which indicates this cluster might include "inflation", "interest rate" or government bonds". Thus, the sequence "Interest rate" is e.g. split into "Interest" and "rate". Accordingly, the sequences of tokens are processed, according to which the sequences of tokens are split into overlapping or non-overlapping subsequences.

In another aspect, the extraction of sub-sequences is an n-gram extraction. Accordingly, distinct methods can be applied, in particular n-gram extraction. Alternatively, plain tokens of the text document can be used, without grouping them into n-grams of length greater than one. Alternatively, a dictionary of known phrases can be used. The n-gram extraction has the advantage that no prior knowledge or linguistic resources such as dictionaries are required. Further, n-grams can capture multi-word expressions which characterize the subject at hand.

In another aspect, the assembly comprises the steps of:
determining the frequency of each feature of the plurality of features within each text document of the plurality of text documents; and/or
determining the features of the plurality of features occurring at least once in at least one text document of the plurality of text documents and/or their according frequencies among the plurality of text documents.

Accordingly, the occurrence and frequency of the features within a single document and across the plurality of documents is considered for the assembly. This assembly is advantageous since the documents are represented in the input as numeric vectors of frequency values, which allows general-purpose clustering algorithms to be used. The feature matrix can be efficiently computed and stored in computer memory.

In another aspect, the at least one matrix is a weight matrix, wherein the weight matrix is associated with the plurality of text documents or with the plurality of features. This way both the weight of the feature and the size of the clusters it occurs in contribute to the ranking of that feature in the output data.

In another aspect, the clustering algorithm is a non-negative matrix factorization (NMF) algorithm. Accordingly, distinct methods can be applied, in particular the NMF-algorithm. Other alternative clustering methods which take a feature matrix as input include k-means and nearest neighbour. NMF has the advantage that it produces explicit interpretable outputs which allow the inspection of the relative importance of features.

In another aspect, the features of the plurality of features having scores above a specified threshold are extracted for step e. Accordingly, the weights of the features of the clustering matrices are used to compute the scores of the features. The scoring method takes into account both the weight of the feature in the feature representation matrix and the relative size of the cluster it occurs in. This allows the ranking which the embodiments of the invention outputs to reflect relative importance of features in the context of the concepts which they characterize.

Further, the embodiments of the invention are directed to a computer program product (non-transitory computer readable storage medium having instructions, which when executed by a processor, perform actions), directly loadable into internal memory of a computer, comprising software code portions for performing the steps of the aforementioned method when said computer program product is running on a computer.

Further, the embodiments of the invention are directed to a system for determining output data for a plurality of text documents, comprising:
a. means for providing a feature matrix as input data; wherein
b. the feature matrix comprises information about frequencies of a plurality of features within the plurality of text documents;
c. means for clustering the feature matrix using a clustering algorithm into at least one clustering matrix; wherein
the at least one clustering matrix comprises information about he cluster membership of each document of the plurality of documents or each feature of the plurality of features,
d. means for assigning at least one score to each feature of the plurality of features based the at least one clustering matrix;
e. means for ranking the plurality of features based on their assigned scores; and
f. means for outputting the ranked features as output data.

BRIEF DESCRIPTION

Some of the embodiments will be described in detail, with references to the following Figures, wherein like designations denote like members, wherein:

FIG. 2 shows exemplary matrices according to an embodiment of the invention;

FIG. 3 shows exemplary output data according to an embodiment of the invention; and FIG. 4 shows exemplary output data according to an embodiment of the invention.

DETAILED DESCRIPTION

Figure 1:
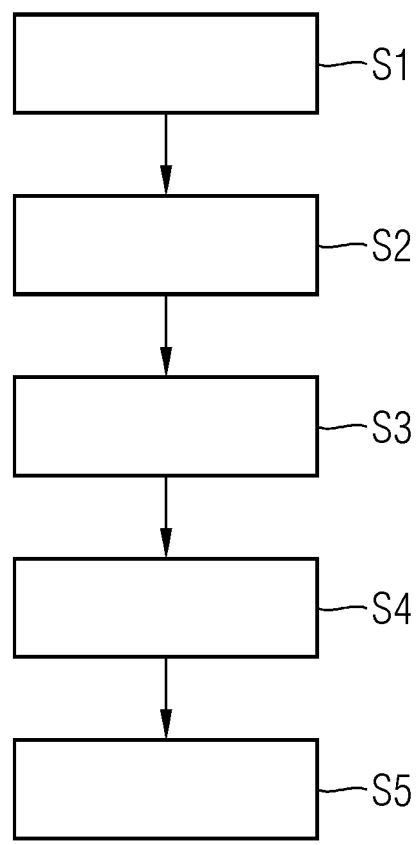
FIG. 1 shows a flow chart of the method in accordance with embodiments of the invention.

The flow chart of the method in accordance with embodiments of the invention is illustrated in FIG. 1. The method steps S1 to S5 will be explained in more detail in the following.

Preprocessing

First, the content of each text document is converted into a sequence of individual tokens. Thereby, the tokens correspond to words. Therefore, distinct standard methods of e.g. stopword removal and tokenization can be applied. Stopword removal removes auxiliary words. Tokenization splits the text of the text documents into words at whitespace and punctuation boundaries.

Feature Extraction

Then, each token sequence is converted into features 12. Thereby n-gram extraction can be applied. In this case, each subsequence whose length is within a configurable range is computed. For example, the range 1 ... 3, can be used for extracting all individual words, word pairs and word triples. Any given expression or term may occur multiple times in a single text document. This results in a multiset of features for each text document.

Feature Matrix Generation

Then, the multiset of features 12 is assembled into a feature matrix 10, S1. The feature matrix 10 can also be referred to as term-frequency matrix. First, the frequency of each feature 12 within each text document is computed, from which the "term frequency/inverse document frequency" (tf-idf) score of each expression in each document is computed, as described further above. Further, the vocabulary of the plurality of text documents is computed. The vocabulary corresponds to the list of all features which occur at least once in any text document.

Accordingly, the feature matrix 10 is a matrix V of size n×f, wherein n is the number of text documents and f is the number of features 12 in the vocabulary. Each cell i,j of the feature matrix contains the tf-idf score of the jth feature in the ith text document. This score is zero, if the feature 12 does not occur in the text document.

Clustering via NMF

Then, the NMF algorithm is applied on the feature matrix 10 as the input V, S2. A configurable parameter k controls the number of clusters into which the text documents are clustered. The resulting matrices W and H can be stored in a suitable data storage unit as clustering matrices 20, 30 and are illustrated in FIG. 2. Thereby, W corresponds to the document representation matrix and H to the feature representation matrix. The rows of H correspond to the clusters and the columns to features.

Computation of Scores for the Features

Then, a score is computed for each feature based on the content of the matrices W and H, S3. First, H is normalized row-wise, such that the rows of H sum up to one and all values are in the range 0 ... 1. Then, those cells from H are extracted, whose values are above a configurable threshold. For example, a baseline value for this threshold is 0.0001, which results in the removal of those cells whose value is very close to zero and thus unimportant for that row. The resulting scored features are shown in FIG. 3.

Ranking the Features Based on the Scores

Then, the features 12 are ranked according to the scores S4. The most meaningful features 12 of are those which have the highest sum of scores. Accordingly, the features 12 which occur in many clusters are more important, and those which have a higher weight within a cluster are more important.

Therefore, the "total score" for a feature 12 is calculated as the sum of all scores in the result set which have been attributed to that feature. The resulting ranked features are shown in FIG. 4. Thus, the result is a ranked list of scored features for the text documents and is outputted S5. The ranked list can be e.g. stored, visualized or transmitted.

As illustrated, the score for the exemplary feature "interest rate" is 0.51, corresponding to the sum of its scores for its occurrences in the clusters "finance" and "technology".

Additionally or alternatively other clustering-scoring- and ranking-algorithms can be applied.

Non-Negative Matrix Factorization (NMF)

The NMF algorithm can be regarded as kind of compression. It finds a lower-dimensional representation of the input data and can be applied where all values in the input matrix are non-negative. Thus, the NMF is a good fit for text feature frequencies. Given the required number of clusters k, the algorithm factorizes the input matrix V into two matrices H and W such that V is approximately equal to W×H. The combined size of W and H is considerably smaller than the size of V.

As shown in FIG. 2, the exemplary NMF considers four documents and two clusters.

The matrix W is of size n×k, where n is the number documents and k is the configured number of clusters. Each row of W is a k-dimensional vector for an input document. This vector is the latent representation of the document and can be interpreted as the distribution of probability of membership of each cluster. The largest value in the vector determines the cluster to which the document most likely belongs.

The H matrix is of size k×f, where k is the number of clusters and f is the number of features in the input data. Each row of H corresponds to a cluster and each column to a feature in the input space. The values of H are feature weightings for the respective clusters. Those features which have the highest values in some row of the matrix H are the features which are most important for the cluster represented by that row.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A computer-implemented method for language processing for a plurality of text documents, the method comprising:
    receiving, by a processor of a computer system, a data set including the plurality of text documents;

processing, by the processor of the computer system, each text document of the plurality of text documents into sequences of tokens based on a text structure of each text document;

converting, by the processor of the computer system, each sequence of tokens of the sequences of tokens into features based on an extraction of sub-sequences of the sequences of tokens;

assembling, by the processor of the computer system, a plurality of the features in the plurality of text documents into a feature matrix based on an occurrence of the plurality of features among the plurality of text documents;

providing, by the processor of the computer system, the feature matrix as input data, wherein the feature matrix comprises information about frequencies of each of the features of the plurality of features within the plurality of text documents;

clustering, by the processor of the computer system, the feature matrix using a clustering algorithm into at least one clustering matrix, wherein the at least one clustering matrix comprises a plurality of cluster memberships associated with of the plurality of features;

assigning, by the processor of the computer system, a score to each feature of the plurality of features for each of the plurality of cluster memberships the feature is associated with, summing, by the processor of the computer system, the scores to provide a total score for each feature of the plurality of features;

ranking, by the processor of the computer system, the plurality of features based on their total score; and outputting, by the processor of the computer system, the ranked plurality of features as output data.

2. The method according to claim 1, wherein the cluster membership is associated with a first meta data set, comprising at least one element selected from the group, comprising:

a categorical or classification information, a concept, a theme, a topic and any other content information associated with at least one text document of the plurality of text documents.

3. The method according to claim 2, wherein the feature is associated with a second meta data set, comprising at least one element selected from the group, comprising:

a word, a phrase and any other expression which is associated with the first meta data set.

4. The method according to claim 3, wherein the output data comprises the first meta data set and/or the second meta data set.

5. The method according to claim 1, wherein the extraction of sub-sequences is an n-gram extraction.

6. The method according to claim 1, wherein the assembly comprises:

determining a frequency of each feature of the plurality of features within each text document of the plurality of text documents; and/or determining features of the plurality of features occurring at least once in at least one text document of the plurality of text documents and/or according frequencies among the plurality of text documents.

7. The method according to claim 1, wherein the at least one matrix is a weight matrix, further wherein the weight matrix is associated with the plurality of text documents or with the plurality of features.

8. The method according to claim 1, wherein the clustering algorithm is a non-negative matrix factorization algorithm.

9. The method according to claim 1, wherein during the step of ranking, by the processor of the computer system, the plurality of features based on their total score, the features of the plurality of features having scores above a specified threshold are extracted.

10. A computer program product, comprising a computer readable hardware storage device having computer readable hardware storage device having computer readable program code stored therein, said program code executable by a processor of a computer system to implement the method according to claim 1 when said computer program product is running on a computer.

11. A system for determining output data for a plurality of text documents, comprising:

means for receiving a data set including the plurality of text documents;

means for processing each text document of the plurality of text documents into sequences of tokens based on a text structure of each text document;

means for converting each sequence of tokens of the sequences of tokens into features based on an extraction of sub-sequences of the sequences of tokens;

means for assembling a plurality of the features in the plurality of text documents into a feature matrix based on an occurrence of the plurality of features among the plurality of text documents;

a means for providing the feature matrix as input data, wherein the feature matrix comprises information about frequencies of each of the features of the plurality of features within the plurality of text documents;

a means for clustering the feature matrix using a clustering algorithm into at least one clustering matrix, wherein the at least one clustering matrix comprises a plurality of cluster memberships associated with of the plurality of features;

a means for assigning a score to each feature of the plurality of features for each of the plurality of cluster memberships the feature is associated with;

means for summing the scores to provide a total score for each feature of the plurality of features;

a means for ranking the plurality of features based on their total score; and a means for outputting the ranked plurality of features as output data.

12. The system according to claim 11, wherein the means for providing and means for outputting are designed as at least one interface.

* * * * *